United States Patent
Samie et al.

(10) Patent No.: US 12,506,386 B2
(45) Date of Patent: Dec. 23, 2025

(54) PHYSICS BASED COOLANT FLOW ALGORITHM FOR ELECTRIC MOTORS

(71) Applicant: GM Global Technology Operations LLC, Detroit, MI (US)

(72) Inventors: Farzad Samie, Franklin, MI (US); Peng Peng, Columbus, MI (US); Xiaofeng Yang, Troy, MI (US); Derek Frei Lahr, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 427 days.

(21) Appl. No.: 18/298,724

(22) Filed: Apr. 11, 2023

(65) Prior Publication Data

US 2024/0348126 A1    Oct. 17, 2024

(51) Int. Cl.
H02K 9/00    (2006.01)
H05K 7/20    (2006.01)

(52) U.S. Cl.
CPC .......... H02K 9/00 (2013.01); H05K 7/20845 (2013.01)

(58) Field of Classification Search
CPC .. H02K 9/00; H02K 9/19; H02K 1/20; H02K 1/32; H02K 9/197; H05K 7/20845
USPC ......................................... 310/52
See application file for complete search history.

(56) References Cited

U.S. PATENT DOCUMENTS

| | | | | |
|---|---|---|---|---|
| 9,774,287 B1 * | 9/2017 | Simili | .......... | H02P 21/0089 |
| 9,847,698 B2 * | 12/2017 | Yoshinori | .......... | H02K 9/19 |
| 2006/0113851 A1 * | 6/2006 | Ishihara | .......... | B60L 3/003 |
| | | | | 310/52 |
| 2011/0279074 A1 * | 11/2011 | Yeh | .......... | G01K 13/08 |
| | | | | 318/473 |
| 2013/0234543 A1 * | 9/2013 | Buttner | .......... | B60L 3/0061 |
| | | | | 310/54 |
| 2016/0099633 A1 * | 4/2016 | Yoshinori | .......... | H02K 9/19 |
| | | | | 310/53 |
| 2019/0291570 A1 * | 9/2019 | Tang | .......... | B60K 11/04 |
| 2020/0204046 A1 * | 6/2020 | Yamada | .......... | H02P 6/08 |
| 2021/0167666 A1 * | 6/2021 | Deguchi | .......... | H02K 5/20 |
| 2023/0344313 A1 * | 10/2023 | Lian | .......... | F16H 57/0424 |
| 2024/0348126 A1 * | 10/2024 | Samie | .......... | H05K 7/20845 |

FOREIGN PATENT DOCUMENTS

JP    2003102147    *  4/2003    ............... H02K 9/19

OTHER PUBLICATIONS

Motor calculations (Year: 2014).*

* cited by examiner

*Primary Examiner* — Ahmed Elnakib
(74) *Attorney, Agent, or Firm* — CANTOR COLBURN LLP

(57) ABSTRACT

A vehicle, system, and method of operating a motor of the vehicle. The motor includes a stator and a rotor. A motor controller controls a motor torque of the motor. A sensor measures a motor speed. A rotor temperature sensor measures a temperature of the rotor. A stator temperature sensor measures a temperature of the stator. A processor determines a stator heat loss at the stator based on the motor torque, the motor speed, and the stator temperature, determines a rotor heat loss at the rotor based on the motor torque, the motor speed, and the rotor temperature, and controls flow of a stator coolant stream through the stator at a stator coolant flow rate based on the stator heat loss and a rotor coolant stream through the rotor at a rotor coolant flow rate based on the rotor heat loss.

20 Claims, 5 Drawing Sheets

400

| °C \ kph | 0 | 20 | 40 | 60 | 80 | 100 | 120 | 140 | 160 | 180 | 200 |
|---|---|---|---|---|---|---|---|---|---|---|---|
| -20 | 0.0 | 0.2 | 0.3 | 0.3 | 0.4 | 0.4 | 0.4 | 0.4 | 0.5 | 0.5 | 0.5 |
| -10 | 0.0 | 0.2 | 0.5 | 0.6 | 0.6 | 0.7 | 0.7 | 0.8 | 0.8 | 0.8 | 0.9 |
| 0 | 0.0 | 0.2 | 0.5 | 0.8 | 1.0 | 1.1 | 1.2 | 1.2 | 1.3 | 1.3 | 1.4 |
| 50 | 0.0 | 0.1 | 0.6 | 1.2 | 1.7 | 2.2 | 2.7 | 3.2 | 3.4 | 3.4 | 3.5 |
| 90 | 0.0 | 0.1 | 0.7 | 1.3 | 1.8 | 2.3 | 2.8 | 3.3 | 3.4 | 3.5 | 3.6 |

| °C \ kph | 0 | 20 | 40 | 60 | 80 | 100 | 120 | 140 | 160 | 180 | 200 |
|---|---|---|---|---|---|---|---|---|---|---|---|
| -20 | 0.0 | 1.2 | 1.7 | 1.9 | 2.0 | 2.2 | 2.3 | 2.5 | 2.6 | 2.8 | 2.9 |
| -10 | 0.0 | 1.3 | 2.6 | 3.2 | 3.4 | 3.6 | 3.8 | 4.0 | 4.2 | 4.4 | 4.5 |
| 0 | 0.0 | 1.3 | 2.8 | 4.1 | 4.8 | 5.1 | 5.3 | 5.6 | 5.8 | 5.9 | 6.1 |
| 50 | 0.0 | 1.3 | 2.3 | 3.1 | 3.8 | 4.6 | 5.5 | 6.2 | 6.5 | 6.6 | 6.8 |
| 90 | 0.0 | 1.2 | 1.9 | 2.7 | 3.5 | 4.4 | 5.2 | 6.1 | 6.4 | 6.6 | 6.8 |

FIG. 5

PHYSICS BASED COOLANT FLOW ALGORITHM FOR ELECTRIC MOTORS

INTRODUCTION

The subject disclosure relates to cooling an electric motor of an electric vehicle and, in particular, to a system and method for cooling a stator of the electric motor and a rotor of the electric motor independently.

An electric motor is used to provide power to an electric vehicle. Efficient operation of the electric motor can be achieved by cooling the motor. Current cooling methods include flowing a coolant through the motor. Calculations for a coolant flow rate are typically based on a motor speed (or vehicle speed) and a fluid temperature. However, the motor can have different cooling requirements at the same vehicle speed. For example, at the same speed, a heat loss at the motor when the vehicle is going uphill is different from the heat loss at the motor when the vehicle is going downhill. Additionally, different motor components can experience heat loss at different rates. Accordingly, it is desirable to provide a system and method for cooling the motor based on relevant operating parameters such as motor torque.

SUMMARY

In one exemplary embodiment, a method of operating a motor of a vehicle is disclosed. A stator heat loss at a stator of the motor is determined based on a motor torque, a motor speed, and a stator temperature. A rotor heat loss at a rotor of the motor is determined based on the motor torque, a rotor speed, and the stator temperature. A stator coolant stream is flowed through the stator at a stator coolant flow rate based on the stator heat loss and a rotor coolant stream is flowed through the rotor at a rotor coolant flow rate based on the rotor heat loss.

In addition to one or more of the features described herein, the method further includes using a valve to separate a pump stream into the stator coolant stream and the rotor coolant stream, wherein the valve selects a proportion of a pump flow rate for the stator coolant stream and the rotor coolant stream. In an embodiment, the valve is a proportional flow valve. The method further includes operating a pump at a pump speed based on a coolant temperature and a sum of the stator coolant flow rate and the rotor coolant flow rate. The method further includes determining the stator coolant flow rate based on the stator heat loss, a coolant temperature and the motor speed and determining the rotor coolant flow rate based on the rotor heat loss, the coolant temperature and the motor speed. The method further includes coordinating an operation of a valve and of a pump to control the rotor coolant flow rate and the stator coolant flow rate independently. The pump flows a coolant in a pump stream and the valve separates the pump stream into the stator coolant stream and the rotor coolant stream.

In another exemplary embodiment, a system for operating a motor of a vehicle is disclosed. The system includes a motor controller configured to control a motor torque of the motor, a sensor for measuring a motor speed, a rotor temperature sensor configured to measure a temperature of a rotor of the motor, a stator temperature sensor configured to measure a temperature of a stator of the motor, and a processor. The processor is configured to determine a stator heat loss at the stator based on the motor torque, the motor speed, and the stator temperature, determine a rotor heat loss at the rotor based on the motor torque, the motor speed, and the rotor temperature, and control flow of a stator coolant stream through the stator at a stator coolant flow rate based on the stator heat loss and a rotor coolant stream through the rotor at a rotor coolant flow rate based on the rotor heat loss.

In addition to one or more of the features described herein, the system further includes a valve and the processor is further configured to control the valve to obtain the stator coolant flow rate for the stator coolant stream and the rotor coolant flow rate for the rotor coolant stream. In an embodiment, the valve is a proportional flow valve. The processor is further configured to operate a pump at a speed based on a coolant temperature and a sum of the stator coolant flow rate and the rotor coolant flow rate. The processor is further configured to determine the stator coolant flow rate based on the stator heat loss, a coolant temperature and the motor speed and determine the rotor coolant flow rate based on the rotor heat loss, the coolant temperature and the motor speed. The processor is further configured to coordinate an operation of a valve and of a pump to control the rotor coolant flow rate and the stator coolant flow rate independently. The processor is further configured to operate the pump to flow a coolant in a pump stream and to operate the valve separates the pump stream into the stator coolant stream and the rotor coolant stream.

In yet another exemplary embodiment, a vehicle is disclosed. The vehicle includes a motor having a stator and a rotor, a motor controller configured to control a motor torque of the motor, a sensor for measuring a motor speed, and a cooling system. The cooling system includes a rotor temperature sensor configured to measure a temperature of the rotor, a stator temperature sensor configured to measure a temperature of the stator, and a processor. The processor is configured to determine a stator heat loss at the stator based on the motor torque, the motor speed, and the stator temperature, determine a rotor heat loss at the rotor based on the motor torque, the motor speed, and the rotor temperature, and control flow of a stator coolant stream through the stator at a stator coolant flow rate based on the stator heat loss and a rotor coolant stream through the rotor at a rotor coolant flow rate based on the rotor heat loss.

In addition to one or more of the features described herein, the cooling system further includes a valve and the processor is further configured to control the valve to obtain the stator coolant flow rate for the stator coolant stream and the rotor coolant flow rate for the rotor coolant stream. The processor is further configured to operate a pump at a speed based on a coolant temperature and a sum of the stator coolant flow rate and the rotor coolant flow rate. The processor is further configured to determine the stator coolant flow rate based on the stator heat loss, a coolant temperature and the motor speed and determine the rotor coolant flow rate based on the rotor heat loss, the coolant temperature and the motor speed. The processor is further configured to coordinate an operation of a valve and of a pump to control the rotor coolant flow rate and the stator coolant flow rate independently. The processor is further configured to operate the pump to flow a coolant in a pump stream and to operate the valve separates the pump stream into the stator coolant stream and the rotor coolant stream.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 shows a rotor coolant flow rate table for determining a flow rate for a rotor coolant stream through the rotor;

FIG. 5 shows a stator coolant flow rate table for determining a flow rate for a stator coolant stream through the stator.

DETAILED DESCRIPTION

Figure 1:
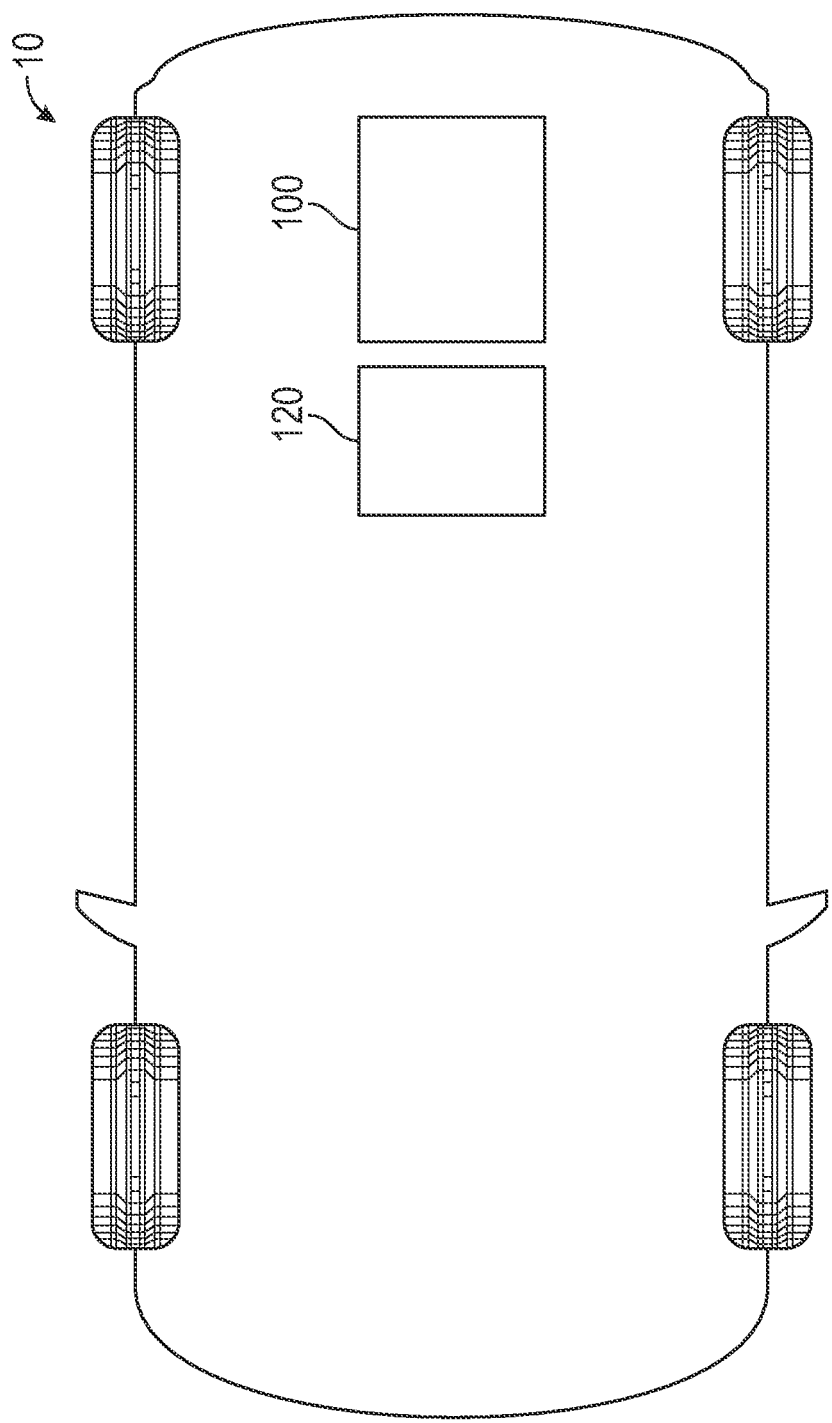
FIG. 1 shows an electric vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an electric vehicle 10. The electric vehicle 10 includes an electric motor 100 that generates motion for use at wheels of the vehicle to generate motion. The electric vehicle 10 further includes a cooling system 120 for cooling the electric motor 100 or maintain the electric motor at a selected temperature.

Figure 2:
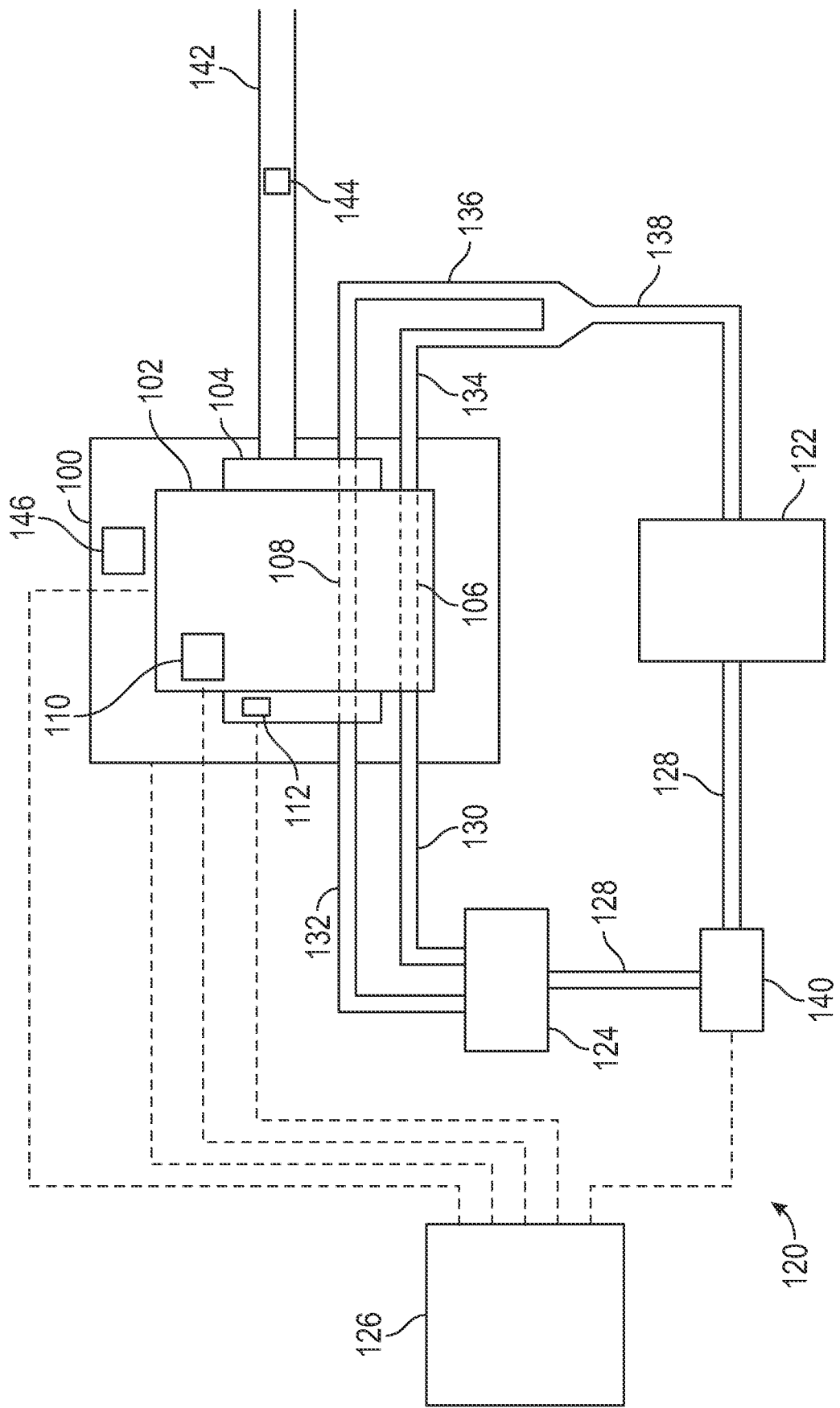
FIG. 2 shows the electric motor for the electric vehicle and the cooling system for regulating a temperature of the electric motor.

FIG. 2 shows the electric motor 100 for the electric vehicle 10 and the cooling system 120 for regulating a temperature of the electric motor. The electric motor 100 includes a stator 102 and a rotor 104 which rotates with respect to the stator to generate a rotary motion that is transmitted to the wheels of the electric vehicle 10 to cause the electric vehicle to move. The rotor 104 is connected to a rotor shaft 142 for transfer of motor torque to the wheels of the vehicle. The stator 102 includes a stator passage 106 through which a coolant can be pumped to cool the stator or regulate the temperature of the stator. Similarly, the rotor 104 includes a rotor passage 108 through which the coolant can be pumped to cool the rotor or regulate the temperature of the rotor.

The cooling system 120 includes a pump 122, a valve 124 and a controller 126. The pump 122 controls the flow of fluid through the electric motor 100. The pump 122 circulates a coolant to the electric motor 100 for cooling the stator 102 and the rotor 104. A pump hose 128 or pump conduit connects from the pump 122 to the valve 124. The valve 124 includes an input and two outputs. A stator input hose 130 or stator input conduit connects from a first output of the valve 124 to an input end of the stator passage 106. A rotor input hose 132 or rotor input conduit connects from the second output of the valve 124 to an input end of the rotor passage 108. A stator output hose 134 and a rotor output hose 136 extend from the output end of the stator passage 106 and the output end of the rotor passage 108, respectively. The stator output hose 134 and the rotor output hose 136 converge into a return hose 138 that connects to the pump 122.

A coolant flows from the pump 122 to the valve 124 in a pump stream flowing at a pump flow rate. The valve 124 separates the pump stream into a stator coolant stream and a rotor coolant stream. The stator coolant stream is directed from the valve 124 through the stator input hose 130, stator passage 106, stator output hose 134, return hose 138 and then returns to the pump 122. Similarly, the rotor coolant stream is directed from the valve 124 through the rotor input hose 132, rotor passage 108, rotor output hose 136, return hose 138 and then back to the pump 122.

In various embodiments, the valve 124 is a proportional flow valve that can be continuously adjusted to select a proportion of the pump stream that is directed into either the stator coolant stream or the rotor coolant stream. The amount that is directed into the stator coolant stream also affects the flow rate of the stator coolant stream. Similarly, the amount that is directed into the rotor coolant stream affects the flow rate of the rotor coolant stream. Thus, the rates at which the stator 102 and the rotor 104 are cooled can be controlled by selecting an appropriate valve configuration. In various embodiments, the pump and the valve can be operated to control the rotor coolant flow rate and the stator coolant flow rate independently of each other.

The pump hose 128 includes a coolant temperature sensor 140 for measuring a temperature of the coolant. A stator temperature sensor 110 is disposed at the stator 102 to measure a stator temperature. A rotor temperature sensor 112 is disposed at the rotor 104 to measure a rotor temperature. In addition, a motor controller 144 controls a torque on the electric motor 100 and a motor speed sensor 146 measures a speed of rotation or angular velocity of the motor.

The coolant temperature sensor 140, stator temperature sensor 110, rotor temperature sensor 112, motor controller 144 and motor speed sensor 146 are in communication with the controller 126 and provide their respective measurements to the controller.

The controller 126 controls operation of the motor and cooling system. The controller 126 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 126 may include a non-transitory computer-readable medium that stores instructions which, when processed by one or more processors of the controller 126, implement a method of cooling the motor according to one or more embodiments detailed herein. In various embodiments, the controller 126 determines a first flow rate for the stator coolant stream and a second flow rate the rotor coolant stream based on various measurements and controls the configuration of the valve and a pump to produce these flow rates at the motor.

Figure 3:
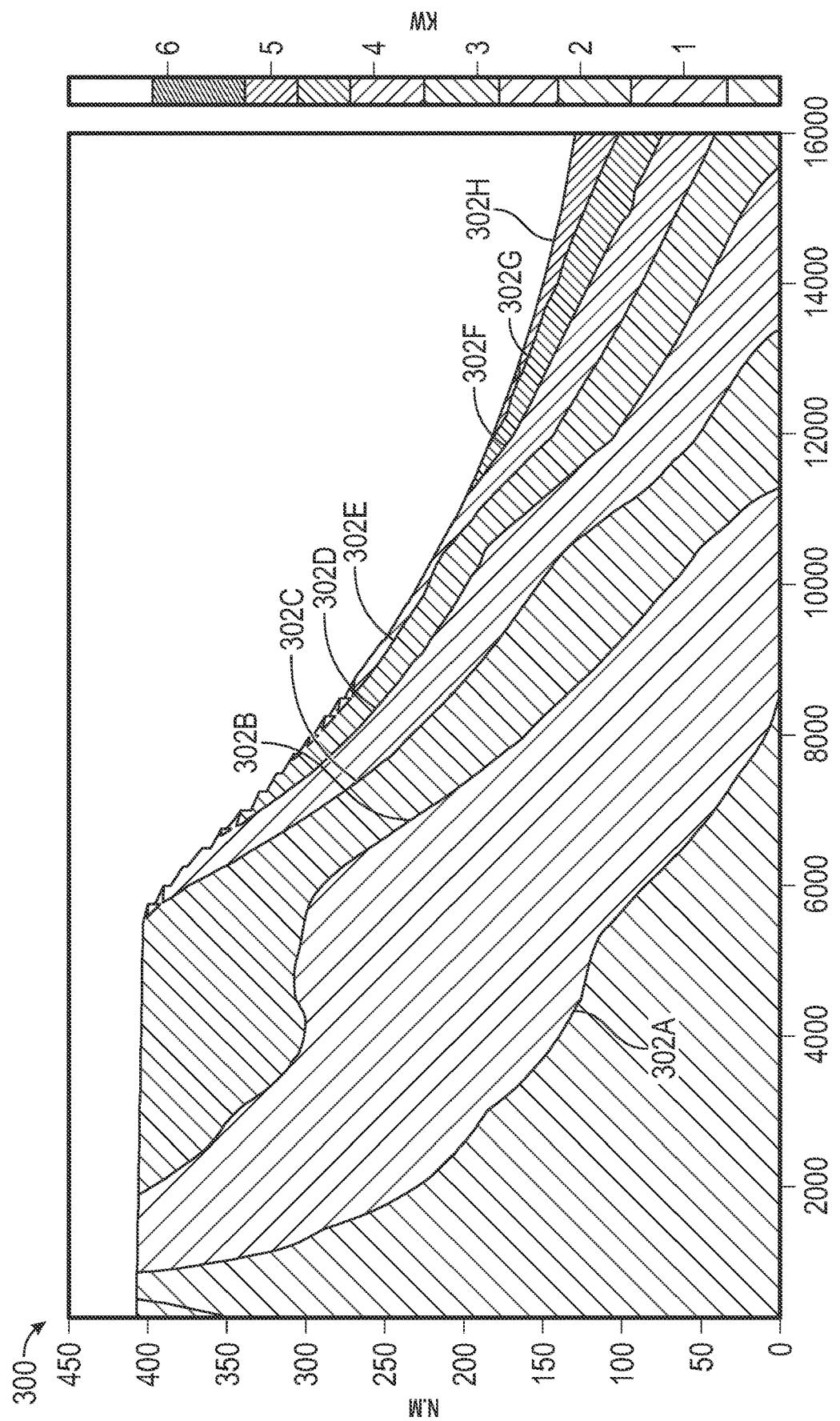
FIG. 3 shows a heat loss diagram for determining a heat loss in a motor component.

FIG. 3 shows a heat loss diagram 300 for determining a heat loss in a motor component. Contour lines 302A-H, separate the graph into various regions of heat loss. The heat flux or heat loss in the electric motor 100 is determined based on the motor speed and the motor torque. The heat loss diagram 300 illustrated in FIG. 3 is for a given coolant temperature. As the coolant temperature changes, a different heat loss diagram 300 is applicable. The heat loss diagram 300 can be applied to either the stator 102 or the rotor 104 to determine their respective heat fluxes. The data from multiple heat loss diagrams can be stored in a lookup table or database and can selected from the database based on the measured temperatures. Alternatively, a model or equation can be used to determine the heat flux based on motor torque, motor speed, coolant temperature and motor component temperature.

FIG. 4 shows a rotor coolant flow rate table 400 for determining a flow rate for a rotor coolant stream through the rotor 104. The rotor coolant flow rate table 400 can be determined using thermal analysis or other suitable method.

The rotor coolant flow rate table 400 is one of multiple tables, each related to a value of the rotor heat flux or rotor heat loss. The rotor coolant flow rate table 400 has as its input parameters a temperature (in° C.) of the rotor coolant and a vehicle speed (in kilometers per hour (kph)). From these parameters, the rotor coolant flow rate table 400 outputs a stator coolant flow rate (in liters per minute (lpm)). Entries in the rotor coolant flow rate table 400 are illustrative only and can be per unit values.

Similarly, FIG. 5 shows a stator coolant flow rate table 500 for determining a flow rate for a stator coolant stream through the stator 102. The stator coolant flow rate table 500 can be determined using thermal analysis or other suitable method. The stator coolant flow rate table 500 is one or multiple tables, each related to a value of stator heat flux or stator heat loss. The stator coolant flow rate table 500 has as its input parameters a temperature (in° C.) of the stator coolant and the vehicle speed (in kilometers per hour (kph)). From these parameters, the stator coolant flow rate table 500 outputs a stator coolant flow rate (in liters per minute (lpm)). Entries in the stator coolant flow rate table 500 are illustrative only and can be per unit values.

Figure 6:
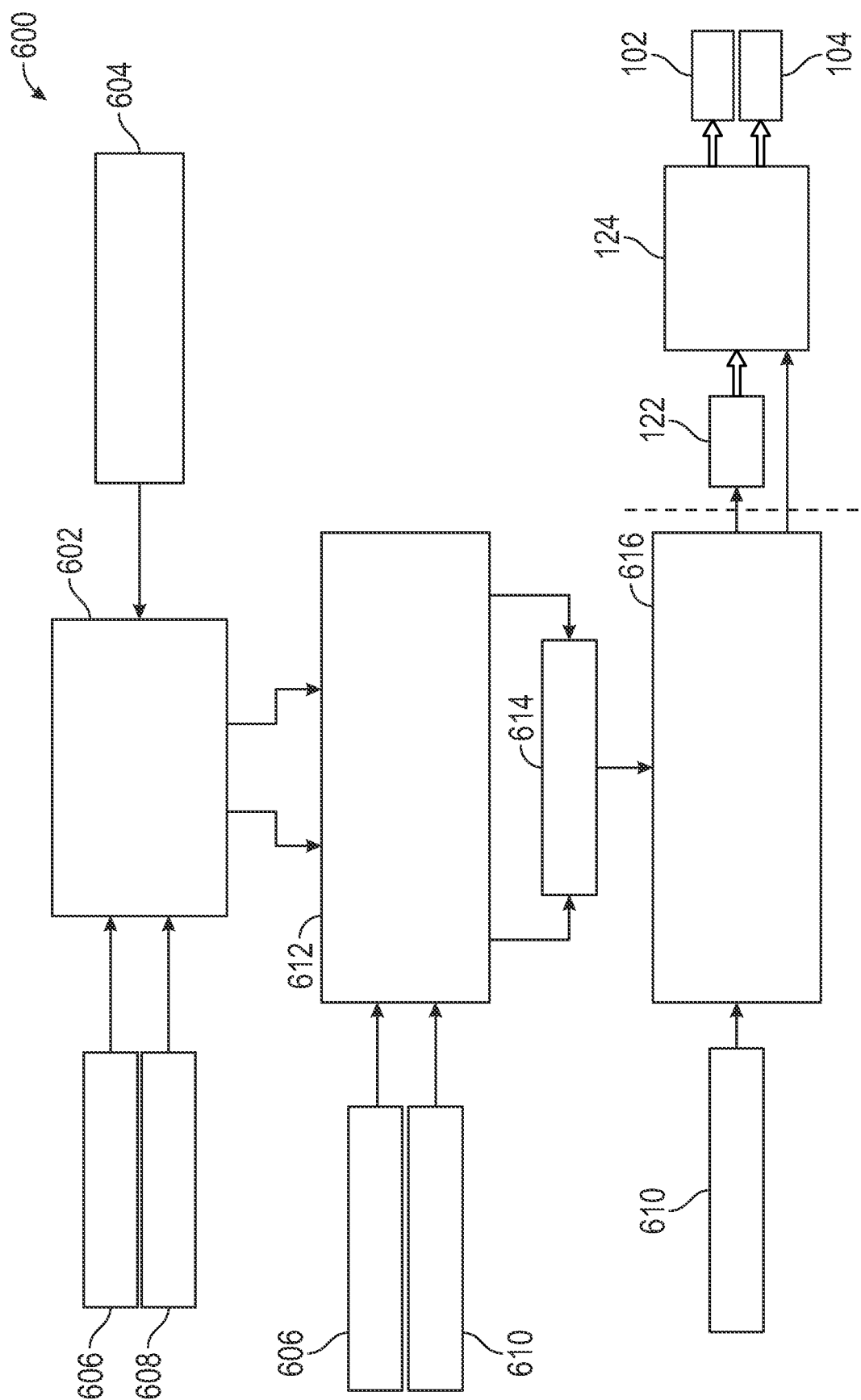
FIG. 6 shows a logical flow diagram for calculating a pump speed and valve configuration to provide suitable cooling to the motor.

FIG. 6 shows a logical flow diagram 600 for calculating a pump speed and valve configuration to provide suitable cooling to the motor. In box 602, the heat loss diagram is used to determine heat losses. The estimated rotor and stator temperatures 604 are used to retrieve the appropriate heat flux diagram. More specifically, the estimated rotor temperature is used to retrieve a first heat flux diagram for the rotor, and the estimated stator temperature is used to retrieve a second heat flux diagram for the stator. The motor speed 606 and motor torque 608 are then used at each of the first heat flux diagram and the second heat flux diagram to determine the rotor heat flux and the stator heat flux, respectively.

In box 612, the rotor heat flux is used to retrieve a rotor coolant flow rate table and the stator heat flux is used to retrieve a stator coolant flow rate table. The motor speed 606 and coolant temperature 610 are then used at the retrieved rotor coolant flow rate table to determine a rotor coolant flow rate and at the stator coolant flow rate table to determine a stator coolant flow rate.

In box 614, the rotor coolant flow rate and the stator coolant flow rate are combined or added together to obtain a pump stream flow rate. In box 616, the pump stream flow rate is used to determine a pump speed and a valve configuration for achieving the determined stator coolant flow rate and the rotor coolant flow rate. The coolant temperature 610 and the pump stream flow rate are inputs to the table of box 616 and are used at a table to determine the pump speed and valve configuration. In various embodiments, the pump speed is sent by the controller to control the pump 122 and the valve configuration is sent by the controller to the valve 124 to control the configuration of the valve. The pump speed and the valve configuration can be calculated so as to control or change the rotor coolant flow rate and the stator coolant flow rate independently of each other.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a motor of a vehicle, comprising:
   storing a plurality of heat loss diagrams at the vehicle;
   selecting a first heat loss diagram from the plurality of heat loss diagrams based on a measured stator temperature;
   using a motor torque and a motor speed at the first heat loss diagram to determine a stator heat loss at a stator of the motor;
   selecting a second heat loss diagram based on a measured rotor temperature;
   using the motor torque and a rotor speed at the second heat loss diagram to determine a rotor heat loss at a rotor of the motor; and
   flowing a stator coolant stream through the stator at a stator coolant flow rate based on the stator heat loss and a rotor coolant stream through the rotor at a rotor coolant flow rate based on the rotor heat loss.

2. The method of claim 1, further comprising using a valve to separate a pump stream into the stator coolant stream and the rotor coolant stream, wherein the valve selects a proportion of a pump flow rate for the stator coolant stream and the rotor coolant stream.

3. The method of claim 2, wherein the valve is a proportional flow valve.

4. The method of claim 1, further comprising operating a pump at a pump speed based on a coolant temperature and a sum of the stator coolant flow rate and the rotor coolant flow rate.

5. The method of claim 1, further comprising selecting a stator coolant flow rate table based on the stator heat loss and determining the stator coolant flow rate using a coolant temperature and the motor speed at the stator coolant flow rate table and selecting a rotor coolant flow rate table based on the rotor heat loss and determining the rotor coolant flow rate using the coolant temperature and the motor speed at the rotor coolant flow rate table.

6. The method of claim 1, further comprising coordinating an operation of a valve and of a pump to control the rotor coolant flow rate and the stator coolant flow rate independently.

7. The method of claim 6, wherein the pump flows a coolant in a pump stream and the valve separates the pump stream into the stator coolant stream and the rotor coolant stream.

8. A system for operating a motor of a vehicle, comprising:
  a database for storing a plurality of heat loss diagrams;
  a motor controller configured to control a motor torque of the motor;
  a sensor for measuring a motor speed;
  a rotor temperature sensor configured to measure a temperature of a rotor of the motor;
  a stator temperature sensor configured to measure a temperature of a stator of the motor; and
  a processor configured to:
    select a first heat loss diagram from the plurality of heat loss diagrams based on a measured stator temperature;
    use a motor torque and a motor speed at the first heat loss diagram to determine a stator heat loss at a stator of the motor;
    select a second heat loss diagram based on a measured rotor temperature;
    use the motor torque and a rotor speed at the second heat loss diagram to determine a rotor heat loss at a rotor of the motor; and
    control flow of a stator coolant stream through the stator at a stator coolant flow rate based on the stator heat loss and a rotor coolant stream through the rotor at a rotor coolant flow rate based on the rotor heat loss.

9. The system of claim 8, further comprising a valve, wherein the processor is further configured to control the valve to obtain the stator coolant flow rate for the stator coolant stream and the rotor coolant flow rate for the rotor coolant stream.

10. The system of claim 9, wherein the valve is a proportional flow valve.

11. The system of claim 8, wherein the processor is further configured to operate a pump at a speed based on a coolant temperature and a sum of the stator coolant flow rate and the rotor coolant flow rate.

12. The system of claim 8, wherein the processor is further configured to select a stator coolant flow rate table based on the stator heat loss and determine the stator coolant flow rate using a coolant temperature and the motor speed the stator coolant flow rate table and select a rotor coolant flow rate table based on the rotor heat loss and determine the rotor coolant flow rate using the coolant temperature and the motor speed at the rotor coolant flow rate table.

13. The system of claim 8, wherein the processor is further configured to coordinate an operation of a valve and of a pump to control the rotor coolant flow rate and the stator coolant flow rate independently.

14. The system of claim 13, wherein the processor is further configured to operate the pump to flow a coolant in a pump stream and to operate the valve separates the pump stream into the stator coolant stream and the rotor coolant stream.

15. A vehicle, comprising:
  a database for storing a plurality of heat loss diagrams;
  a motor having a stator and a rotor;
  a motor controller configured to control a motor torque of the motor;
  a sensor for measuring a motor speed;
  a cooling system comprising:
    a rotor temperature sensor configured to measure a temperature of the rotor;
    a stator temperature sensor configured to measure a temperature of the stator; and
    a processor configured to:
      select a first heat loss diagram from the plurality of heat loss diagrams based on a measured stator temperature;
      use a motor torque and a motor speed at the first heat loss diagram to determine a stator heat loss at a stator of the motor;
      select a second heat loss diagram based on a measured rotor temperature;
      use the motor torque and a rotor speed at the second heat loss diagram to determine a rotor heat loss at a rotor of the motor; and
      control flow of a stator coolant stream through the stator at a stator coolant flow rate based on the stator heat loss and a rotor coolant stream through the rotor at a rotor coolant flow rate based on the rotor heat loss.

16. The vehicle of claim 15, wherein the cooling system further comprises a valve and the processor is further configured to control the valve to obtain the stator coolant flow rate for the stator coolant stream and the rotor coolant flow rate for the rotor coolant stream.

17. The vehicle of claim 16, wherein the processor is further configured to operate a pump at a speed based on a coolant temperature and a sum of the stator coolant flow rate and the rotor coolant flow rate.

18. The vehicle of claim 15, wherein the processor is further configured to select a stator coolant flow rate table based on the stator heat loss and determine the stator coolant flow rate using a coolant temperature and the motor speed at the stator coolant flow rate table and select a rotor coolant flow rate table based on the rotor heat loss and determine the rotor coolant flow rate using the coolant temperature and the motor speed at the rotor coolant flow rate table.

19. The vehicle of claim 15, wherein the processor is further configured to coordinate an operation of a valve and of a pump to control the rotor coolant flow rate and the stator coolant flow rate independently.

20. The vehicle of claim 19, wherein the processor is further configured to operate the pump to flow a coolant in a pump stream and to operate the valve separates the pump stream into the stator coolant stream and the rotor coolant stream.

* * * * *